United States Patent [19]

Smith

[11] 4,011,716
[45] Mar. 15, 1977

[54] FUEL CONTROL SYSTEM FOR GAS TURBINE ENGINE

[75] Inventor: Trevor Stanley Smith, Sutton Coldfield, England

[73] Assignee: Lucas Industries Limited, Birmingham, England

[22] Filed: Apr. 3, 1975

[21] Appl. No.: 564,606

[30] Foreign Application Priority Data

May 21, 1974 United Kingdom ............. 22533/74

[52] U.S. Cl. .......................................... 60/39.28 R
[51] Int. Cl.² .......................................... F02C 9/10
[58] Field of Search ............................. 60/39.28 R

[56] References Cited

UNITED STATES PATENTS

| | | | |
|---|---|---|---|
| 3,098,356 | 7/1963 | Joline | 60/39.28 R |
| 3,173,468 | 3/1965 | McCombs | 60/39.28 R |
| 3,808,797 | 5/1974 | Robinson | 60/39.28 R |
| 3,808,801 | 5/1974 | Taylor | 60/39.28 R |

FOREIGN PATENTS OR APPLICATIONS

| | | | |
|---|---|---|---|
| 879,982 | 10/1961 | United Kingdom | 60/39.28 |
| 979,061 | 1/1965 | United Kingdom | 60/39.28 |
| 935,942 | 9/1963 | United Kingdom | 60/39.28 |
| 808,419 | 2/1959 | United Kingdom | 60/39.28 |

*Primary Examiner*—Clarence R. Gordon

[57] ABSTRACT

A servo-operated shut-off valve for a gas turbine engine fuel system has a main valve control element and an electrically-operated pilot valve control member for controlling a servo-operating pressure for the main valve. The pilot valve control member and main valve control element are resiliently interconnected so that movement of the main valve control element urges the pilot valve control member in a direction to cause the servo pressure to maintain that movement of the main valve control element.

5 Claims, 1 Drawing Figure

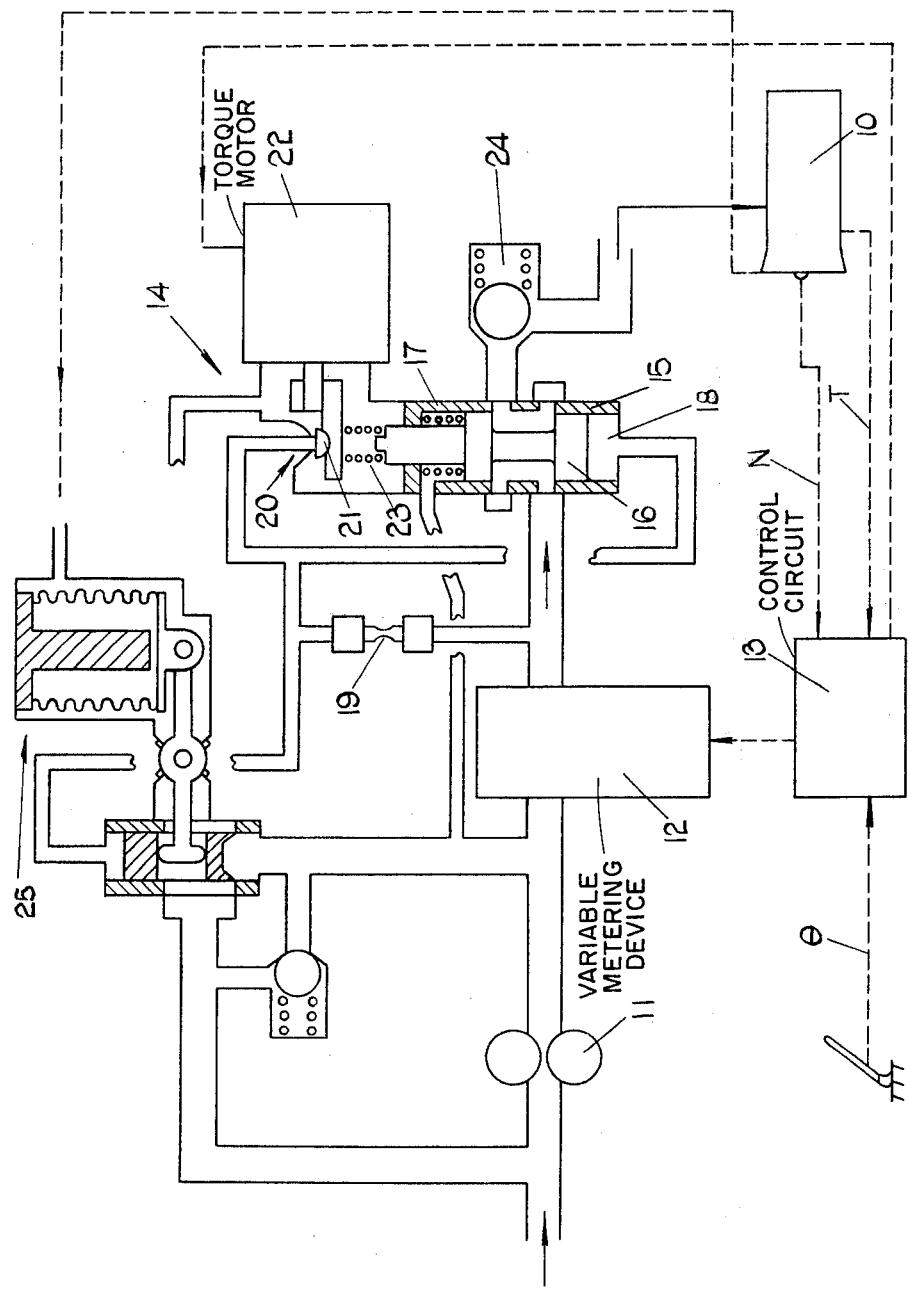

FUEL CONTROL SYSTEM FOR GAS TURBINE ENGINE

This invention relates to servo operated shut-off valve arrangements for gas turbine engine fuel control systems.

According to the invention a servo operated shut-off valve arrangement for a gas turbine engine fuel control system comprises a main valve having a control element movable in first and second directions in response to an increase and decrease respectively in a servo pressure signal, a pilot valve including a control member movable in a first direction to increase said servo pressure signal and in a second direction to decrease said servo pressure signal, and a resilient coupling between said control element and said control member said coupling acting, when said control element moves in its first direction, to urge said pilot valve in its first direction, and when said control element moves in its second direction to urge said pilot valve in its second direction.

A further aspect of the invention relates to a fuel control system for a gas turbine engine, comprising a pump, a variable metering device downstream of said pump and a servo operated shut-off valve arrangement as above defined downstream of said metering device and operable to shut off fuel flow to the engine.

An example of the invention will now be described with reference to the accompanying DRAWING.

A gas turbine engine 10 is supplied with fuel by a pump 11 which is driven by the engine 10. Fuel flow to the engine 10 is regulated by a variable metering device 12 controlled by an electrical control circuit 13. Circuit 13 is responsive to engine speed N, engine temperature T, and to the position 0 of an engine power demand control.

Downstream of the metering device 12 is a servo operated shut-off valve arrangement 14. Arrangement 14 includes a main valve 15 having a spool control element 16 which is biased towards a shut position by the pressure downstream of pump 11 and by a spring 17. Element 16 is urged towards an open position by a servo pressure signal in a chamber 18, the effective area of element 16 subjected to the pressure in chamber 18 being substantially larger than that subjected to the pressure downstream of pump 11.

The pressure in chamber 18 is derived, via a flow restrictor 19 by means of a pilot valve 20 having a half ball control member 21. Control member 21 is movable by a torque motor 22 either to a position in which pilot valve 20 is shut or to a position in which pilot valve 20 is open. Torque motor 22 is responsive to first and second electrical signals from a portion of control circuit 13 which forms part of the shut-off valve arrangement, the first electrical signal being generated in response to a requirement to start the engine, and the second electrical signal being generated in response to a requirement to stop the engine. A spring 23 engages the spool control element 16 and the pilot valve control member 20 so that, in the absence of any electrical signal to the torque motor 22 and when control element 16 is in its open position, the pilot valve 20 is shut. In these circumstances the pressure in chamber 18 remains at a maximum value and the main valve 15 is effectively locked open. It is further arranged that, in the absence of a control signal to torque motor 22 and when control element 16 is in its shut position the spring 23 opens the pilot valve 20. In these circumstances the shut-off valve 15 is effectively locked shut. Torque motor 22 can, on receipt of the appropriate signal, overcome the force applied by spring 23 to control member 20 in either of the above conditions.

The appropriate portion of control circuit 13 is also responsive to an increase in engine speed N to above a predetermined level to generate the aforesaid second control signal, thus moving the control element 16 to its shut position.

A spring loaded pressure raising valve 24 is provided between the main valve 15 and the engine 10. The system also includes a spill valve arrangement 25 which is responsive to the pressure drop across the metering device 12, an increase in said pressure drop acting to increase spill flow from the downstream to the upstream side of pump 11. The spill valve arrangement 25 is also responsive to an increase in the pressure $P_1$ at the engine compressor intake to increase spill flow.

I claim:

1. A servo-operated shut-off valve for a gas turbine engine fuel control system, comprising a main valve having a control element movable in first and second directions in response to an increase and a decrease respectively in a servo pressure signal, a pivot valve including a control member movable in a first direction to increase said servo pressure signal and in a second direction to decrease said servo pressure signal, and a resilient coupling between said control element and said control member, said coupling acting, when said control element moves in its first direction, to urge said pilot valve in its first direction, and when said control element moves in its second direction to urge said pilot valve in its second direction.

2. A servo-operated shut-off valve for a gas turbine engine fuel control system, comprising a main valve having a control element movable in said first and second directions in response to an increase and a decrease respectively in a servo pressure signal, a pilot valve including a control member movable in a first direction to increase said servo pressure signal and in a second direction to decrease said servo pressure signal, a resilient coupling between said control element and said control member, said coupling acting, when said control element moves in its first direction, to urge said pilot valve in its first direction, and when said control element moves in its second direction to urge said pilot valve in its second direction, and means, responsive to first and second electrical signals for moving said pilot valve control member in said first and second directions respectively.

3. A valve arrangement as claimed in claim 2 in which said means for moving the pilot valve control member comprises a torque motor.

4. A valve arrangement as claimed in claim 2 which includes means for generating said first and second electrical signals in response to respective requirements to start and stop the engine.

5. A valve arrangement as claimed in claim 4 in which said electrical signal generating means is also responsive to an engine speed in excess of a predetermined value to generate said second electrical signal.